(12) United States Patent
Kim

(10) Patent No.: US 8,292,426 B2
(45) Date of Patent: Oct. 23, 2012

(54) NOSE SUPPORT FOR GLASSES

(76) Inventor: Jeong Min Kim, Busan-Si (KR)

( * ) Notice: Subject to any disclaimer, the term of this patent is extended or adjusted under 35 U.S.C. 154(b) by 142 days.

(21) Appl. No.: 12/958,111

(22) Filed: Dec. 1, 2010

(65) Prior Publication Data

US 2011/0157543 A1    Jun. 30, 2011

(30) Foreign Application Priority Data

Dec. 28, 2009   (KR) .................. 10-2009-0133489

(51) Int. Cl.
*G02C 5/12* (2006.01)

(52) U.S. Cl. .............. 351/136; 351/137; 351/138

(58) Field of Classification Search .......... 351/136, 351/137, 138, 139, 65, 78, 80, 81
See application file for complete search history.

(56) References Cited

U.S. PATENT DOCUMENTS

| 4,500,179 A * | 2/1985 | Schonhut ................. 351/137 |
| 4,896,957 A * | 1/1990 | Speer ..................... 351/137 |
| 5,581,312 A * | 12/1996 | Chen ...................... 351/138 |

* cited by examiner

*Primary Examiner* — Hung Dang
(74) *Attorney, Agent, or Firm* — IPLA P.A.; James E. Bame

(57) ABSTRACT

A nose support for glasses including: a fitting fixed to a glass frame by means of welding; a T-shaped fixing leg fixed to the fitting by means of welding; a silicone tube having a first hole and a first insertion groove formed on the upper side thereof, a second hole and a second insertion groove formed on the lower side thereof, a third hole formed to be penetrated into the first insertion groove and the second insertion groove, reinforcement protruding portions formed outside the first insertion groove and the second insertion groove, and a depressed portion formed between the reinforcement protruding portions; a nose pad-coupling fitting having the T-shaped fixing projection fittingly inserted into the second hole and the second insertion groove of the silicone tube; and a nose pad fixed to the nose pad-coupling fitting by means of a screw.

2 Claims, 7 Drawing Sheets

NOSE SUPPORT FOR GLASSES

CROSS REFERENCE

This application claims foreign priority under Paris Convention and 35 U.S.C. §119 to Korean Patent Application No. 10-2009-0133489, filed Dec. 28, 2009 with the Korean Intellectual Property Office.

BACKGROUND OF THE INVENTION

The present invention relates to a nose support for glasses that is provided with a silicone tube having a most excellent and stable structure to allow a nose pad to softly and elastically rest upon a bridge of a wearer's nose, without having slippage on the nose, to safely distribute and absorb the pressure applied to the bridge of the wearer's nose even if an impact is applied to the wearer's nose, thereby reducing pinching the wearer's nose, and to make the wearer feel most comfortable while in use even though he has any nose shape and size.

Generally, the present invention is suggested by improving Korean Patent No. 2009-62282 issued to the same applicant to this invention, and the prior art discloses a nose support for glasses having a generally straight silicone tube shortly cut with a diameter of $2.2\phi$ and a bore of $0.6\phi$. According to the soft property of silicone, soft touch is applied to the bridge of a wearer's nose when the nose support rests thereon, but if glasses are relatively heavy or the wearer runs or exercises, the nose support easily slips on the bridge of the wearer's nose. In more detail, according to the prior art, when a T-shaped fixing leg fixed to a fitting by means of welding and a T-shaped fixing projection formed protrudedly from a nose pad-coupling fitting are fittingly inserted into the silicone tube, the silicone tube may tear off, and alternatively, if a force is applied to pull the silicone tube in a state where the T-shaped fixing leg and the T-shaped fixing projection are inserted into the silicone tube, or if a force is applied in every direction after the pulling state, the silicone tube may also tear off.

In the meanwhile, Korean Utility Model Registration No. 0429511 discloses a nose support for glasses wherein a fixing fitting fixed to a glass frame is fixed as a unitary body to a hard connection leg, a connection rod is formed as a unitary body with a nose pad, and a fitting tube is formed as a unitary body with the connection rod, thereby fitting the fitting tube around the connection leg. In such prior art, the nose pad, the connection rod and the fitting tube are formed of one body made of soft synthetic resin, a fitting protrusion is formed around the end portion of the nose leg, and a fitting projection is formed around the inner bottom portion of the fitting tube, thereby allowing the fitting tube to be fitted around the connection leg, while preventing the fitting tube from being easily escaping from the connection leg.

After the experiments for the prior art Korean Utility Model Registration No. 0429511, however, it is found that it is difficult to make the nose support as a product by the following problems. That is, glasses parts should be light in weight and be clean in their outer appearance, and further, they should have relatively small diameter and size so as to reduce the obstruction of view. Accordingly, the connection leg has a diameter of a little more or less than 0.5 mm. Thus, if the fitting tube fitted around the connection leg has an outer diameter of more than $2.5\phi$ to $3.5\phi$, it looks bulky and bad, which is thus rejected from glasses sellers.

Accordingly, the diameter of the fitting tube should be in a range of $2.5\phi$ to $3.5\phi$, and further, if the fitting tube is too long, it also does not have any value of product. Thus, in general, the diameter of the connection rod integrally connecting the nose pad and the fitting tube should be smaller than the diameter of the fitting tube. In this case, so as to provide compatibility to existing glasses frames, the length of the fitting tube should not be over 6 mm.

In the meanwhile, after the nose pad, the connection rod and the fitting tube are made as a unitary body through a mold, the present inventor has found that the connection rod, which is formed by one of a variety of synthetic resins including urethane and has the diameter of 1 mm to 2 mm and a predetermined short length, does not have both of strong elasticity and soft property, that is, does not have a strong property and a soft property at the same time. In other words, if the elasticity of the connection rod having relatively small diameter and short length is good, the soft property is weakened, and contrarily, if the softness thereof is excellent, the elasticity is bad, so that a good quality of product cannot be made. In this case, if the elasticity is emphasized, a wearer has foreign body sensation and feels dull when the nose pad rests on the bridge of the wearer's nose. Contrarily, if the softness is emphasized, the wearer feels comfortable when the nose pad rests on the bridge of the wearer's nose, but if the weight of the whole glasses is relatively heavy or if the wearer runs or exercises, the nose pad easily slips from the bridge of the wearer's nose.

Theoretically, the connection rod having both of the elasticity and the softness is made, but really, it is almost impossible to make such connection rod because of the technical limitation of the injection work and the physical property limitation of the synthetic resin. Additionally, since the nose pad and the fitting tube are molded as a unitary body to the connection rod, it is actually impossible to make them as one body, while providing the balance of the elasticity and the softness.

Furthermore, when the fitting tube is made of a soft synthetic resin, the fitting protrusion of the connection leg is locked to the fitting projection of the fitting tube, but if the fitting tube is pulled with a slight force, it is easily escaped from the connection leg, which makes it hard to make the nose support as a product.

In conclusion, it is found that so as to make the nose support as a product, while a nose pad-coupling fitting having the nose pad fixed thereon by means of a screw is being used with existing one, a silicone tube has to be positioned between a fitting fixed to a glass frame by means of welding and the nose pad-coupling fitting. At this time, the silicone tube obtains both of elasticity and softness, and further, the silicone tube should be structured newly to prevent easily escaping from the fitting and the nose pad-coupling fitting even when it is pulled therefrom with a relatively strong force.

Next, Japanese Utility Model Application Laid-Open No. 57-45625 discloses another conventional nose support, wherein a pipe similar to the silicone tube is used to just insertingly assemble a pin fixed to a glass frame by means of welding and a bed plate connecting two pipes, and the pipe is made of metal or hard plastic. Further, a plate spring is welded inside the pipe so as to allow the insertion state of the pin and the bed plate to be stabilized, and an arm connected to a nose pad is insertedly welded into a hole formed on the side of the pipe, such that it is found that the structure of the prior art Japanese Utility Model Application Laid-Open No. 57-45625 does not have any relation to the structure, operation and effect of the present invention as will be described below and further no comparison between them is made.

On the other hand, Japanese Utility Model Application Laid-Open No. 63-33125 discloses still another conventional nose support, wherein a tube made by coating a plastic core with silicone is bent to a shape of "Λ" and is fitted around a protruding pin or a fitting fixed to a glass frame by means of welding or a screw. Since the plastic core is coated around the surface thereof with silicone and is bent to the shape of "Λ" in such a manner as to be fixed to the glass frame, this prior art has a relatively better wearing feeling than existing hard nose supports, but it is found that the structure of the prior art Japanese Utility Model Application Laid-Open No. 63-33125 does not have any relation to the structure, operation and effect of the present invention as will be described below and further no comparison between them is made.

SUMMARY OF THE INVENTION

Accordingly, the present invention has been made in view of the above-mentioned problems occurring in the prior art, and it is an object of the present invention to provide a nose support for glasses that can be made as a better product.

To accomplish the above object, according to a first aspect of the present invention, there is provided a nose support for glasses including: a fitting adapted to be fixed to a glass frame by means of welding; a T-shaped fixing leg adapted to be fixed to the fitting by means of welding in such a manner as to be fittingly inserted into a first hole and a first insertion groove of a silicone tube; a reinforcing plate disposed between the fitting and the T-shaped fixing leg in such a manner as to be brought into close contact with the top periphery of the T-shaped fixing leg when the T-shaped fixing leg is fittingly inserted into the first hole and the first insertion groove of the silicone tube; the silicone tube having the first hole and the first insertion groove formed on the upper side from the center thereof so as to fittingly insert the T-shaped fixing leg thereinto, a second hole and a second insertion groove formed on the lower side from the center thereof so as to fittingly insert a T-shaped fixing projection of a nose pad-coupling fitting thereinto, a third hole formed to be penetrated into the first insertion groove and the second insertion groove and having a diameter equal to the first hole and the second hole, reinforcement protruding portions formed outside the first insertion groove and the second insertion groove and having a substantially large diameter, and a depressed portion formed between the reinforcement protruding portions and having a relatively smaller diameter than the reinforcement protruding portions; the nose pad-coupling fitting having the T-shaped fixing projection formed as a unitary body thereto or by means of welding in such a manner as to be fittingly inserted into the second hole and the second insertion groove of the silicone tube; and a nose pad adapted to be fixed to the nose pad-coupling fitting by means of a screw.

To accomplish the above object, according to a second aspect of the present invention, there is provided a nose support for glasses including: a fitting adapted to be fixed to a glass frame by means of welding; a metal cap adapted to be fixed to the fitting by means of welding in such a manner as to tightly cover the top periphery of a silicone tube; a first fixing pin disposed to be penetrated into the top sides of the metal cap and the silicone tube so as to fix the metal cap and the silicone tube thereto; the silicone tube having a through-hole formed to be penetrated along a center thereof, reinforcement protruding portions formed symmetrically on the upper and lower portions from the central portion thereof and having a substantially large diameter, a depressed portion formed between the reinforcement protruding portions and having a relatively smaller diameter than the reinforcement protruding portions; a nose pad-coupling fitting having a cap formed as a unitary body thereto so as to tightly cover the underside periphery of the silicone tube; a second fixing pin disposed to be penetrated into the bottom sides of the cap formed on the underside of the silicone tube and the silicone tube so as to fix the cap and the silicone tube thereto; and a nose pad adapted to be fixed to the nose pad-coupling fitting by means of a screw.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, an explanation on a nose support for glasses according to preferred embodiments of the present invention will be in detail given with reference to the attached drawings. According to first and second embodiments of the present invention, silicone tubes 10 and 20 have the same outer shape and size as each other and just have different internal structures thereof, and fittings 30 and 70 fixed to a glass frame by means of welding are shown as one example, which of course may be changed to another shape.

According to the first embodiment of the present invention, a structure of the silicone tube 10 as a most important part of the present invention will be first described with reference to FIG. 3.

Figure 1:
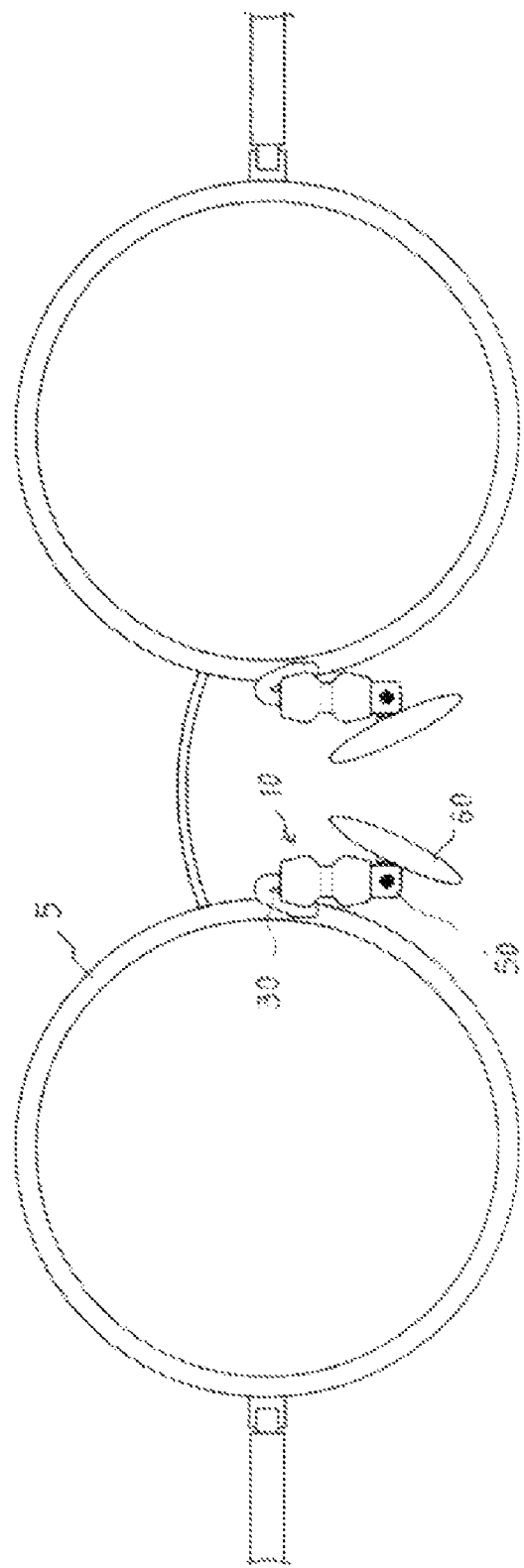
FIG. 1 is a front view showing the usage state of a nose support for glasses according to a first embodiment of the present invention.
Figure 3:
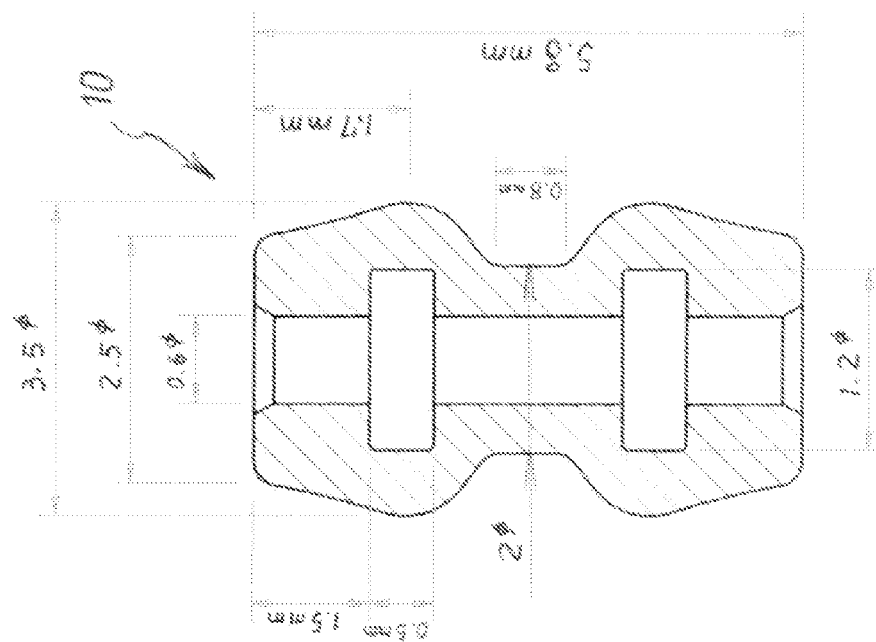
FIG. 3 is a sectional view showing the real sizes of the parts in a silicone tube of the nose support for glasses according to the first embodiment of the present invention.

FIG. 3 is a sectional view showing the real sizes of the parts in the silicone tube 10 adopted in the first embodiment of the present invention, which are finally designed and made as a product after many tests have been passed, wherein the silicone tube 10 has a length of 5.8 mm and a diameter of each of top and bottom peripheries of 2.5φ, and each of reinforcement protruding portions 12 and 12a has a diameter of 3.5φ.

Further, each of a first hole 11-1, a second hole 11-2 and a third hole 11 has a diameter of 0.6φ, and each of a first insertion groove 11-3 and a second insertion groove 11-4 has a diameter of 1.2φ. Also, each of the first hole 11-1 and the second hole 11-2 has a depth of 1.5 mm, and each of the first insertion groove 11-3 and the second insertion groove 11-4 has a width (vertical distance) of 0.5 mm. A depressed portion 13 has a diameter of 2φ, and the distance from the top periphery of the silicone tube 10 to the peak point of the reinforcement protruding portion 12 is 1.7 mm, while the distance from the bottom periphery of the silicone tube 10 to the peak point of the reinforcement protruding portion 12a is being 1.7 mm.

In the meanwhile, the silicone tube 20 adopted in the second embodiment of the present invention has the same size as the silicone tube 10 in the first embodiment of the present invention, except that the first insertion groove 11-3 and the second insertion groove 11-4 do not exist thereinto and a through hole 21 is just formed along the center of the silicone tube 20. In this case, it is desirable that the diameter of the through hole 21 should be smaller by 20% than the diameters of the first hole 11-1, the second hole 11-2 and the third hole 11, and the reason for the reduction of the diameter of the through hole 21 of the silicone tube 20 will be explained below.

A T-shaped fixing leg 40, which is fixed to the fitting 30 by means of welding, is inclined and inserted into the first hole 11-1 of the silicone tube 10 in such a manner as to be seated tight-fittingly into the first insertion groove 11-3. According to the present invention, since the silicone tube 10 (and the silicone tube 20) is made of silicone to which a predetermined amount of curing agent is added to have both of elasticity and softness, it does not tear off even though the T-shaped fixing leg 40 is forcedly inserted into the first hole 11-1.

Figure 2:
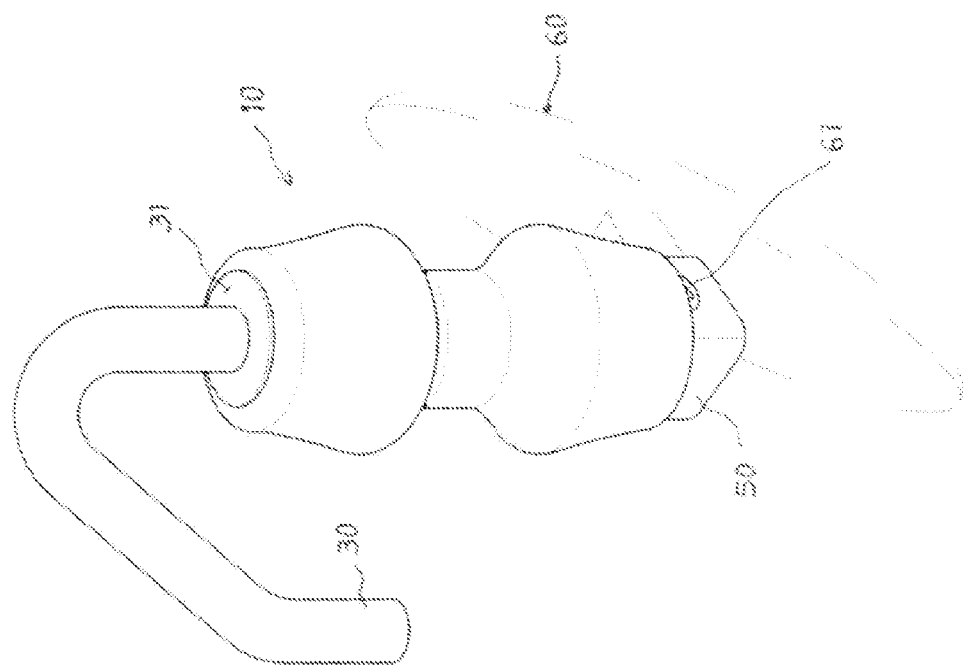
FIG. 2 is a perspective view showing the usage state of the nose support for glasses according to the first embodiment of the present invention.
Figure 4:
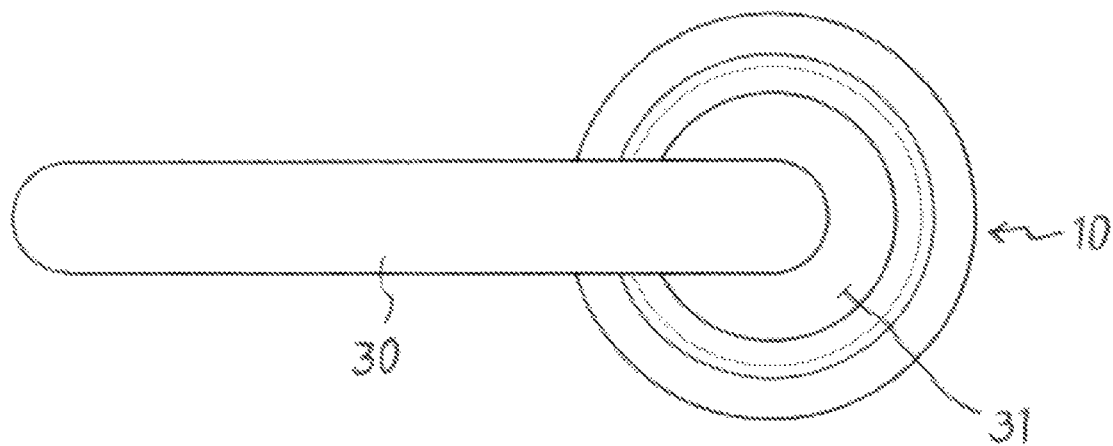
FIG. 4 is a plan view showing the nose support for glasses according to the first embodiment of the present invention.
Figure 5:
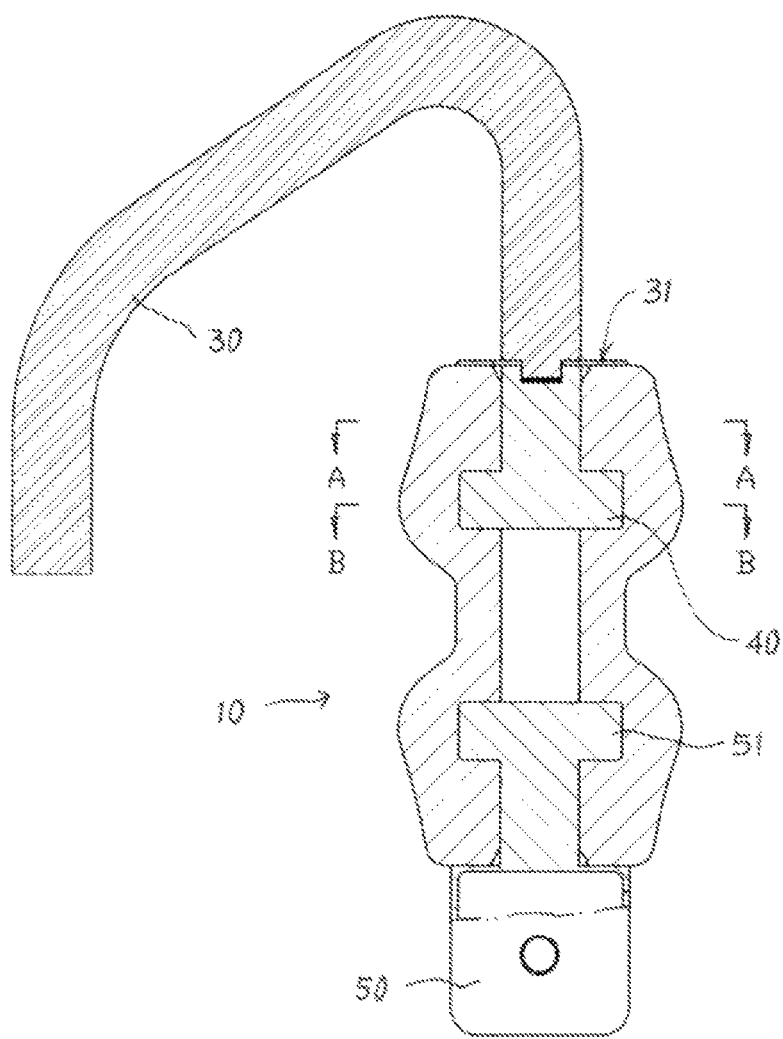
FIG. 5 is a sectional view showing the nose support for glasses according to the first embodiment of the present invention.
Figure 6:
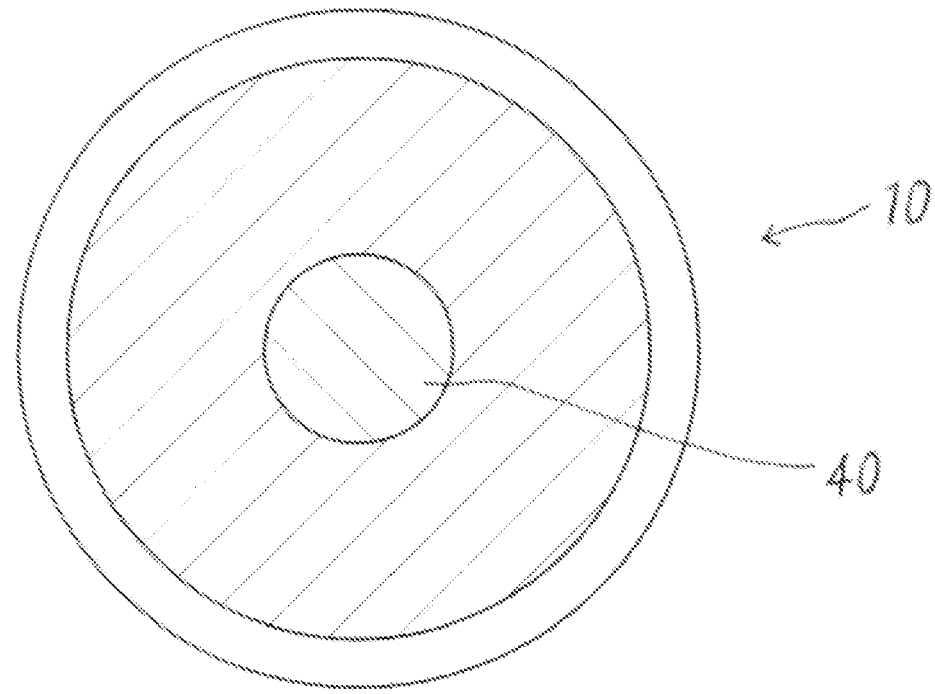
FIG. 6 is an enlarged sectional view taken along the line A-A of FIG. 5.
Figure 7:
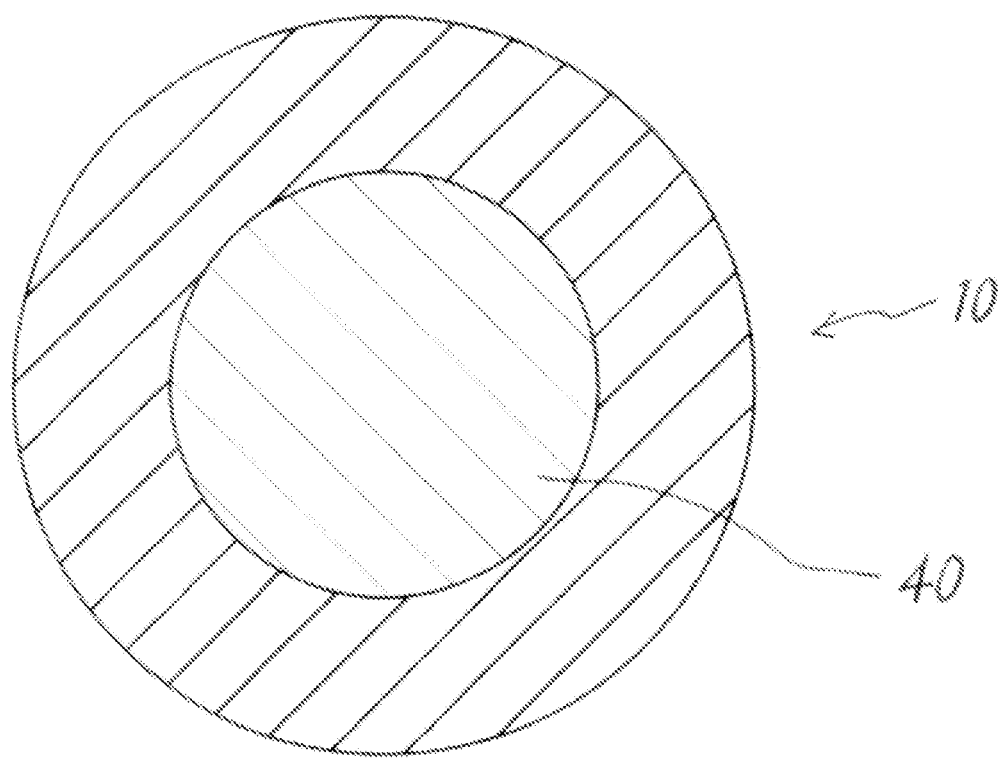
FIG. 7 is an enlarged sectional view taken along the line B-B of FIG. 5.
Figure 9:
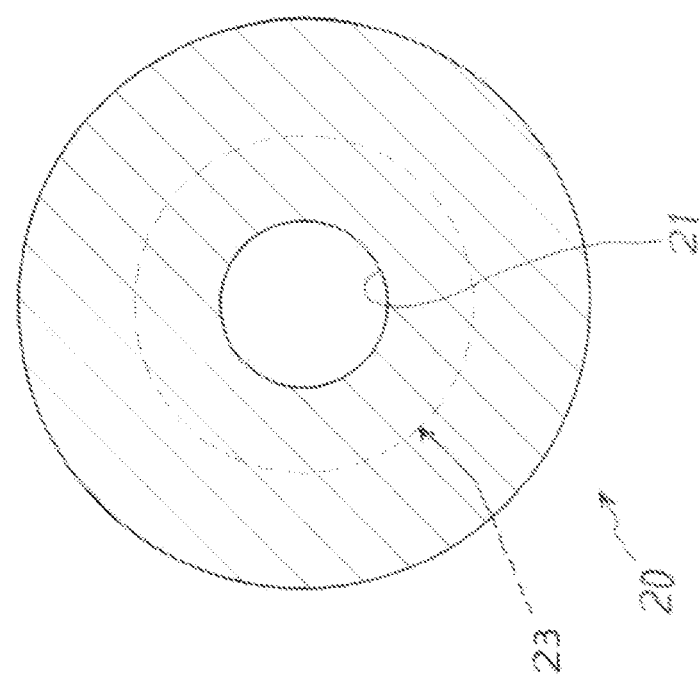
FIG. 9 is an enlarged sectional view taken along the line D-D of FIG. 11.
Figure 8:
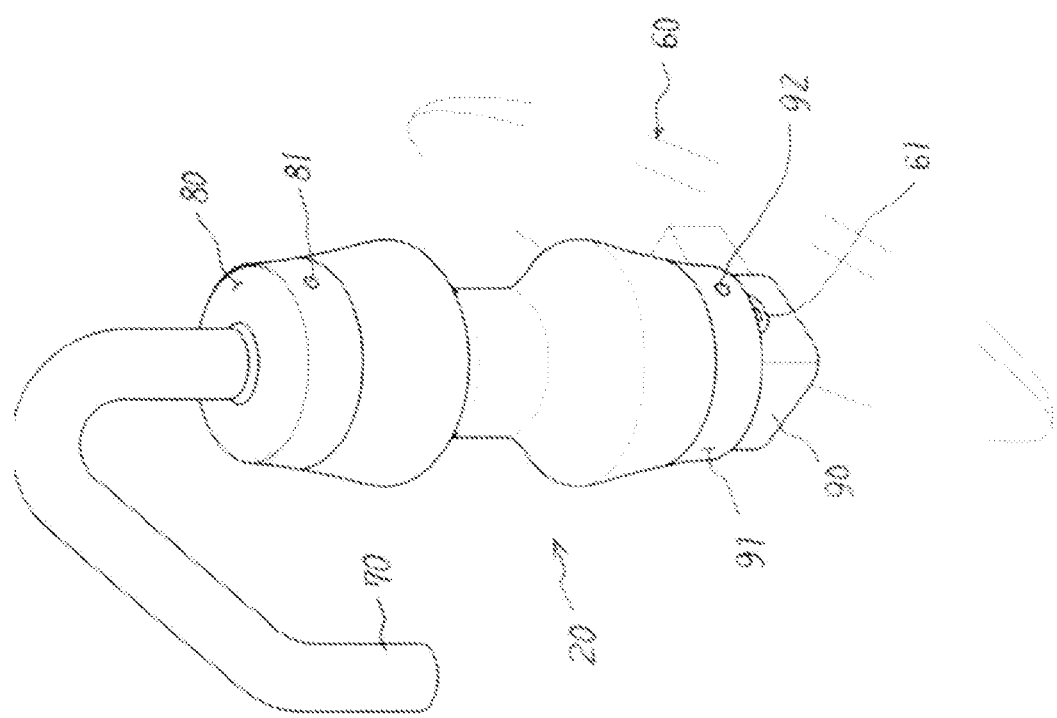
FIG. 8 is a perspective view showing the usage state of a nose support for glasses according to a second embodiment of the present invention.
Figure 10:
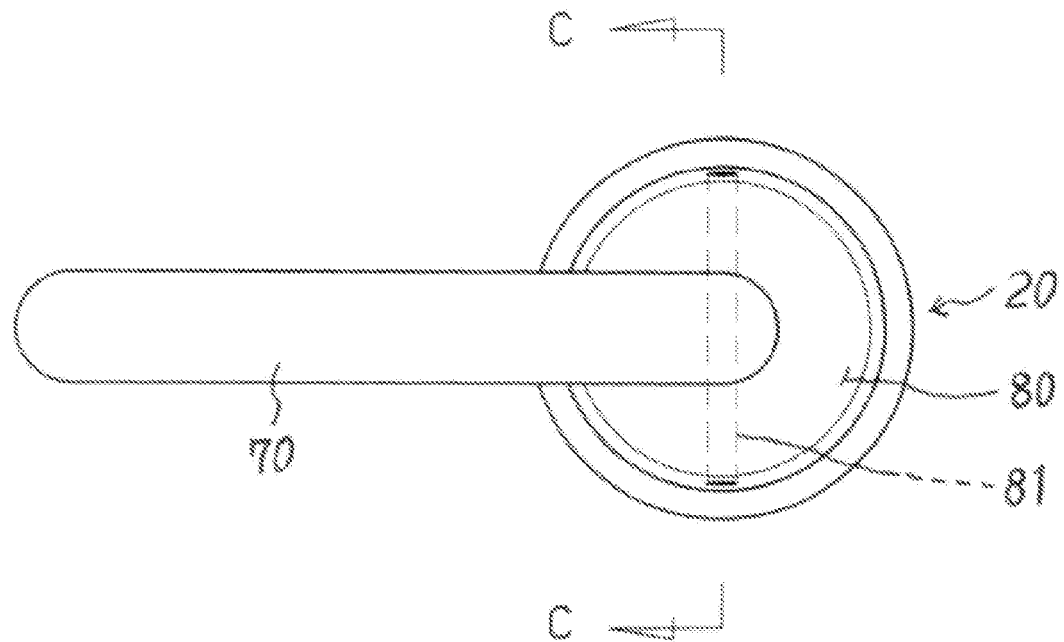
FIG. 10 is a plan view showing the nose support for glasses according to the second embodiment of the present invention.

Next, in the same manner as mentioned above, a T-shaped fixing projection 51 of a nose pad-coupling fitting 50 is inserted into the second hole 11-2 in such a manner as to be seated tight-fittingly into the second insertion groove 11-4, and then, a hose pad 60 is coupled by means of a screw 61 to the nose pad-coupling fitting 50, thereby providing the usage state as shown in FIG. 2.

According to the first embodiment of the present invention, the nose support for glasses has the same position as the positions of existing nose supports for glasses and also has a compatible size with the existing nose supports, and further, when the nose pad 60 rests onto the bridge of a wearer's nose, the depressed portion 13 is slightly bent to apply gentle elasticity to the bridge of the wearer's nose. Even when the wearer runs or exercises, the glasses with the nose support according to the present invention do not slip on the wearer's nose, and even though the wearer wears relatively heavy glasses like glass lens, the glasses do not slip on the wearer's nose. In other words, since elasticity and softness are provided in an ideally balanced state, the nose support for glasses according to the present invention can be gently fitted on the bridge of the wearer's nose, without having any slippage on the wearer's nose. That reason is that the silicone tube 10 adopted in the first embodiment of the present invention is not bent entirely, but just bent at the depressed portion 13 to apply predetermined elasticity to the wearer's nose, while having no bending at the reinforcement protruding portions 12 and 12a into which the shaped fixing leg 40 and the T-shaped fixing projection 51 are inserted fittingly.

According to the present invention, even when the wearer runs or exercises, or even though the wearer wears relatively heavy glasses, the nose pad 60 does not slip on the wearer's nose, and further, the problems the conventional silicone tube has had that the upper side reinforcement protruding portion 12 abuts against the bridge of the wearer's nose because of severe bending of the silicone tube are clearly solved, thereby making the wearer feel comfortable and soft while in use. Referring to the sizes as shown in FIG. 3, the diameter of the depressed portion 13 is 2φ on the basis of a light glass frame using plastic lens as most general glasses, but if glass lens is used or relatively heavy glass frame is used, the depressed portion 13 has a diameter in a range of 2.1φ to 3.0φ.

In the meanwhile, according to the first embodiment of the present invention, the reinforcing plate 31 is positioned fixedly by means of the fitting 30 brought into contact with the top periphery of the silicone tube 10 and the T-shaped fixing leg 40, and as mentioned above, when the depressed portion 13 of the silicone tube 10 is bent, the reinforcing plate 31 serves to more stably fix the upper side reinforcement protruding portion 12 to the T-shaped fixing leg 40, thereby keeping the upper side reinforcement protruding portion 12 from being bent. Further, the formation of the reinforcing plate 31 allows the T-shaped fixing leg 40 to be easily inserted into its inserted position, and it is also needed in view of an outer appearance. However, the reinforcing plate 31 is not necessarily needed in the preferred embodiment of the present invention, and therefore, it can be removed from the parts of the present invention.

According to the first embodiment of the present invention, the reinforcement protruding portions 12 and 12a serve to erect the silicone tube 10 elastically and make their thickness increased when the T-shaped fixing leg 40 and the T-shaped fixing projection 51 are inserted thereinto, thereby preventing the silicone tube 10 from tearing off. In addition, the increase of the thicknesses of the reinforcement protruding portions 12 and 12a permits the T-shaped fixing leg 40 and the T-shaped fixing projection 51 to be firmly maintained after the insertion thereinto, thereby preventing the T-shaped fixing leg 40 and the T-shaped fixing projection 51 from being easily escaped from the silicone tube 10.

In the finished state as shown in FIG. 2, if the silicone tube 10 or the nose pad 60 pulls down to apply a weight of 1.5 Kg to the silicone tube 10 or to the nose pad 60, the silicone tube 10 does not tear off and further the T-shaped fixing leg 40 or the t-shaped fixing projection 51 does not escape from the silicone tube 10. Contrarily, in the conventional practices as mentioned above, even though a weight of about 500 g is applied to the silicone tube, the silicone tube or the fitting tube tears off easily and is escaped from its fixed position.

Next, an explanation of a nose support for glasses according to the second embodiment of the present invention will be given with reference to FIGS. 8 to 11.

Figure 11:
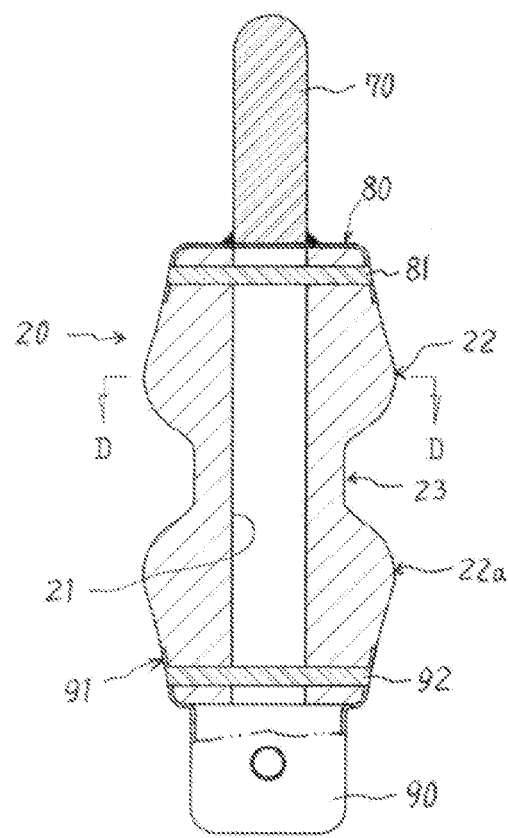
FIG. 11 is a sectional view taken along the line C-C of FIG. 10.
Figure 12:
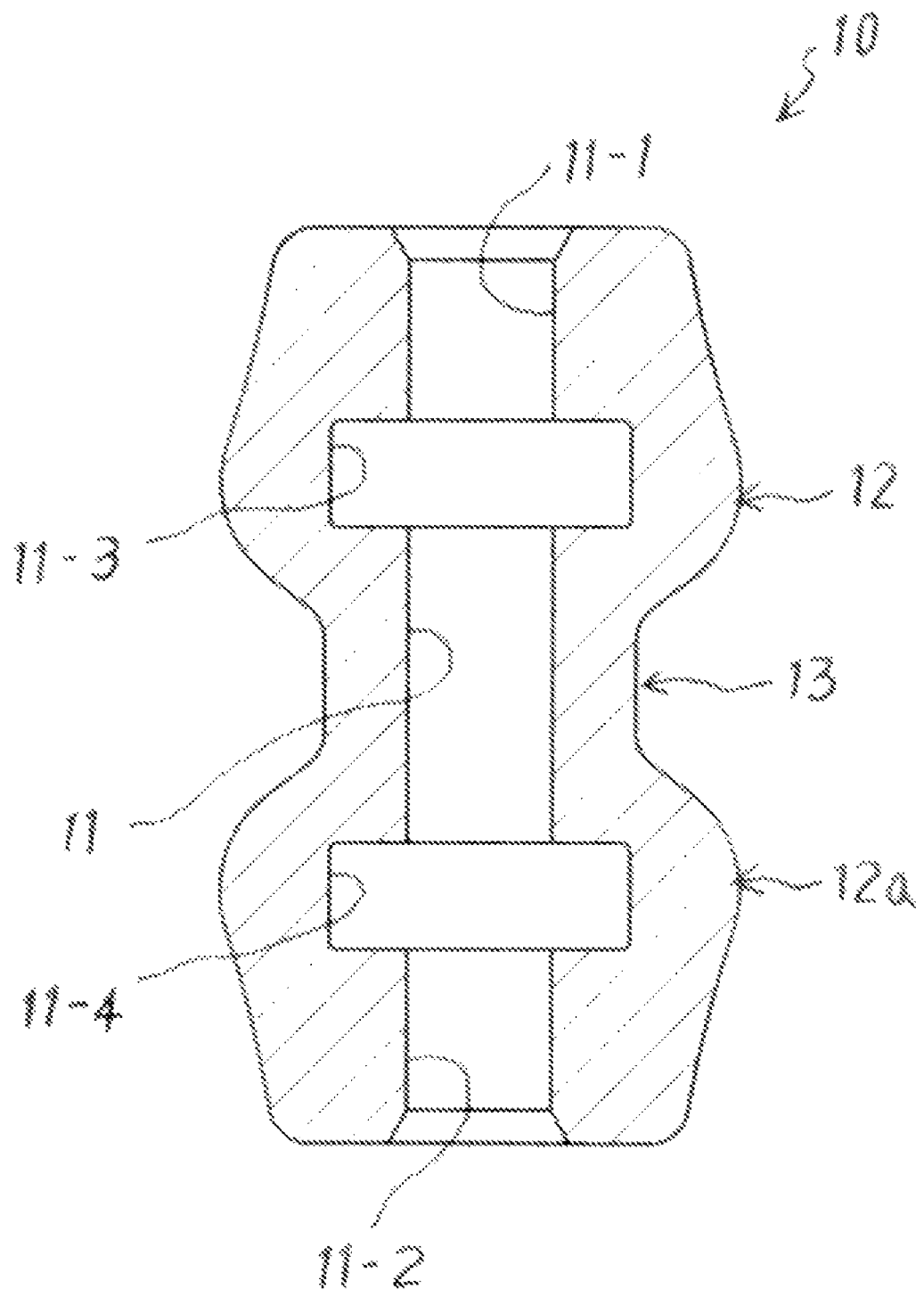
FIG. 12 is a sectional view showing the structure of the silicone tube in the nose support for glasses according to the first embodiment of the present invention.

As shown in FIG. 11, the outer shape and size of the silicone tube 20 in the second embodiment of the present invention are the same as those of the silicone tube 10 in the first embodiment of the present invention, but the silicone tube 20 has a through hole 21 formed to be penetrated along the center thereof.

On the upper side of the silicone tube 20, as shown in FIG. 11, desirably, at a place moved by 3 mm downwardly from the top periphery of the silicone tube 20, a first fixing pin 81 having a diameter of 1φ is disposed in such a manner as to be penetrated into a metal cap 80 formed as a unitary body with a fitting 70 by means of welding. In the same manner as above, a second fixing pin 92 is disposed at a place moved by 3 mm downwardly from the underside periphery of the silicone tube 20 in such a manner as to be penetrated into a cap 91 of a nose pad-coupling fitting 90.

Holes are punched by means of a drill before the first fixing pin 81 and the second fixing pin 92 are mounted, and then, the first fixing pin 81 and the second fixing pin 92 are inserted into the holes. At this time, their insertion is desirably carried out by the application of an adhesive, and also, the application of the adhesive is desirably needed when the metal cap 80 and the cap 91 of the nose pad-coupling fitting 90 are fitted into the silicone tube 20.

According to the second embodiment of the present invention, it is desirable that the diameter of the through hole 21 should be smaller by 20% than the diameters of the first hole 11-1, the second hole 11-2 and the third hole 11, and the reason for the reduction of the diameter of the through hole 21 of the silicone tube 20 is as follows. According to the first embodiment of the present invention, since the T-shaped fixing leg 40 and the T-shaped fixing projection 51 are inserted fittingly into the peaks of the reinforcement protruding portions 12 and 12a, the diameter of 0.6φ of the third hole 11 does not matter in providing the effects of the present invention, but according to the second embodiment of the present invention, since the through hole 21 is formed to a straight line, the silicone tube 20 is much bent if the diameter of the through hole 21 is 0.6φ, thereby to cause inconveniences in use. Accordingly, it is very preferable that the through hole 21 has a diameter of 4.8φ, and thus, the nose support for glasses according to the second embodiment of the present invention is very useful for ultra light glasses for women or for glasses for children and babies.

When the glasses are worn, of course, reinforcement protruding portions 22 and 22a of the silicone tube 20 are fixed rigidly by means of their thick thickness and the formation of the metal cap 80, the cap 91 of the nose pad-coupling fitting 90, the first fixing pin 81 and the second fixing pin 91, without any bending, such that while they are being erected elastically, only a depressed portion 21 formed in the middle portion of the silicone tube 20 is bent.

According to the second embodiment of the present invention, on the other hand, the first fixing pin 81 and the second fixing pin 92 are made of plastic, which is desirable in view of their manufacturing, and also, they may be formed of hard wood such as tree peony, oak tree and so on. In the finished state as shown in FIG. 11, if the silicone tube 20 or the nose pad-coupling fitting 90 pulls down to apply a weight of 1.5 Kg to the silicone tube 20, the silicone tube 20 does not tear off and further does not tear separately from the first fixing pin 81 and the second fixing pin 92.

According to the first and second embodiments of the present invention, as described above, the silicone tube 10 in the first embodiment of the present invention is not bent over 45° even though it is adopted for relatively heavy glasses, and the upper side reinforcement protruding portion 12 is not brought into contact with the bridge of the wearer's nose, thereby achieving the balance of elasticity and softness. Also, the silicone tube 20 in the second embodiment of the present invention is not bent over 45° even though it is adopted for relatively lighter glasses by 10% than the glasses used in the first embodiment of the present invention, and the upper side reinforcement protruding portion 22 is not brought into contact with the bridge of the wearer's nose, thereby achieving the balance of elasticity and softness.

Additionally, the silicone tubes 10 and 20 do not tear off or are not escaped from their fixed positions even if a relatively heavy weight of 1.5 Kg is applied thereto, and the silicone tubes 10 and 20 are not bent forcelessly even when the wearer runs or exercises or even when relatively heavy glasses are worn, thereby preventing their contact with the bridge of the wearer's nose or thereby keeping their nose pad from slipping on the bridge of the wearer's nose. Furthermore, the operations and effects of the silicone tubes 10 and 20 are not changed at all even at the conditions of temperatures of 200° C. and −60° C., which ensures that their durability is very excellent.

As set forth in the foregoing, according to the first and second embodiments of the present invention, the nose support for glasses has the silicone tube having more improved and developed structure and assembling process to remove the problems suffered in the conventional soft plastic or straight type silicone tubes, thereby providing substantially soft, stable and comfortable wearing feelings to the wearer and further ensuring high competitiveness and development in the glass industrial field.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A nose support for glasses, comprising:
a fitting adapted to be fixed to a glass frame by means of welding;
a T-shaped fixing leg adapted to be fixed to the fitting by means of welding in such a manner as to be fittingly inserted into a first hole and a first insertion groove of a silicone tube;
a reinforcing plate disposed between the fitting and the T-shaped fixing leg in such a manner as to be brought into close contact with the top periphery of the T-shaped fixing leg when the T-shaped fixing leg is fittingly inserted into the first hole and the first insertion groove of the silicone tube;
the silicone tube having the first hole and the first insertion groove formed on the upper side from the center thereof so as to fittingly insert the T-shaped fixing leg thereinto, a second hole and a second insertion groove formed on the lower side from the center thereof so as to fittingly insert a T-shaped fixing projection of a nose pad-coupling fitting thereinto, a third hole formed to be penetrated into the first insertion groove and the second insertion groove and having a diameter equal to the first hole and the second hole, reinforcement protruding portions formed outside the first insertion groove and the second insertion groove and having a substantially large diameter, and a depressed portion formed between the reinforcement protruding portions and having a relatively smaller diameter than the reinforcement protruding portions;
the nose pad-coupling fitting having the T-shaped fixing projection formed as a unitary body thereto or by means of welding in such a manner as to be fittingly inserted into the second hole and the second insertion groove of the silicone tube; and
a nose pad adapted to be fixed to the nose pad-coupling fitting by means of a screw.

2. A nose support for glasses, comprising:
a fitting adapted to be fixed to a glass frame by means of welding;
a metal cap adapted to be fixed to the fitting by means of welding in such a manner as to tightly cover the top periphery of a silicone tube;
a first fixing pin disposed to be penetrated into the top sides of the metal cap and the silicone tube so as to fix the metal cap and the silicone tube thereto;
the silicone tube having a through-hole formed to be penetrated along a center thereof, reinforcement protruding portions formed symmetrically on the upper and lower portions from the central portion thereof and having a substantially large diameter, a depressed portion formed between the reinforcement protruding portions and having a relatively smaller diameter than the reinforcement protruding portions;

a nose pad-coupling fitting having a cap formed as a unitary body thereto so as to tightly cover the underside periphery of the silicone tube;

a second fixing pin disposed to be penetrated into the bottom sides of the cap formed on the underside of the silicone tube and the silicone tube so as to fix the cap and the silicone tube thereto; and a nose pad adapted to be fixed to the nose pad-coupling fitting by means of a screw.

* * * * *